United States Patent [19]

Klemen

[11] Patent Number: 5,147,181

[45] Date of Patent: Sep. 15, 1992

[54] HYDRODYNAMIC RETARDER

[75] Inventor: Donald Klemen, Carmel, Ind.

[73] Assignee: General Motors Corporation, Detroit, Mich.

[21] Appl. No.: 704,236

[22] Filed: May 22, 1991

[51] Int. Cl.$^5$ ............................................. B63H 1/26
[52] U.S. Cl. .................................. 416/223 R; 416/180; 416/DIG. 2
[58] Field of Search ............... 416/180, 223 R, DIG. 2

[56] References Cited

U.S. PATENT DOCUMENTS

| | | | |
|---|---|---|---|
| 885,098 | 4/1908 | Steinmetz | 416/223 R X |
| 1,465,085 | 5/1923 | Wilkinson | 416/223 A X |
| 2,916,258 | 12/1959 | Klint | 416/223 A X |
| 3,037,459 | 6/1962 | Nelden | 416/180 |
| 4,084,374 | 4/1978 | Schlitz | 416/223 A X |
| 4,608,823 | 9/1986 | Maze | 416/223 A X |

Primary Examiner—Edward K. Look
Assistant Examiner—Todd Mattingly
Attorney, Agent, or Firm—Donald F. Scherer

[57] ABSTRACT

A hydrodynamic retarder has a stationary element and a rotary element, each of which has a semi-toroidal cavity with a plurality of blade members disposed therein. The semi-toroidal cavities are presented in facing relation with the blade curvatures being oppositely directed. The blade members each have a fluid flow profile that accommodates constant acceleration of the fluid from entrance to exit.

6 Claims, 1 Drawing Sheet

5,147,181

HYDRODYNAMIC RETARDER

BACKGROUND OF THE INVENTION

This invention relates to hydrodynamic retarders and more particularly to the blade form incorporated in the hydrodynamic retarder.

SUMMARY OF THE INVENTION

It is an object of this invention to provide an improved hydrodynamic retarder having a pair of semi-toroidal cavities in each of which a plurality of equally spaced blades are disposed, and further wherein, each blade has a fluid flow profile which accommodates constant acceleration of fluid flow from the entrance to the exit.

It is another object of this invention to provide an improved blade profile for a hydrodynamic retarder wherein constant acceleration of the fluid along the blade profile is attained.

These and other objects and advantages of the invention will be more apparent from the following description and drawings.

DESCRIPTION OF AN EXEMPLARY EMBODIMENT

Figure 1:
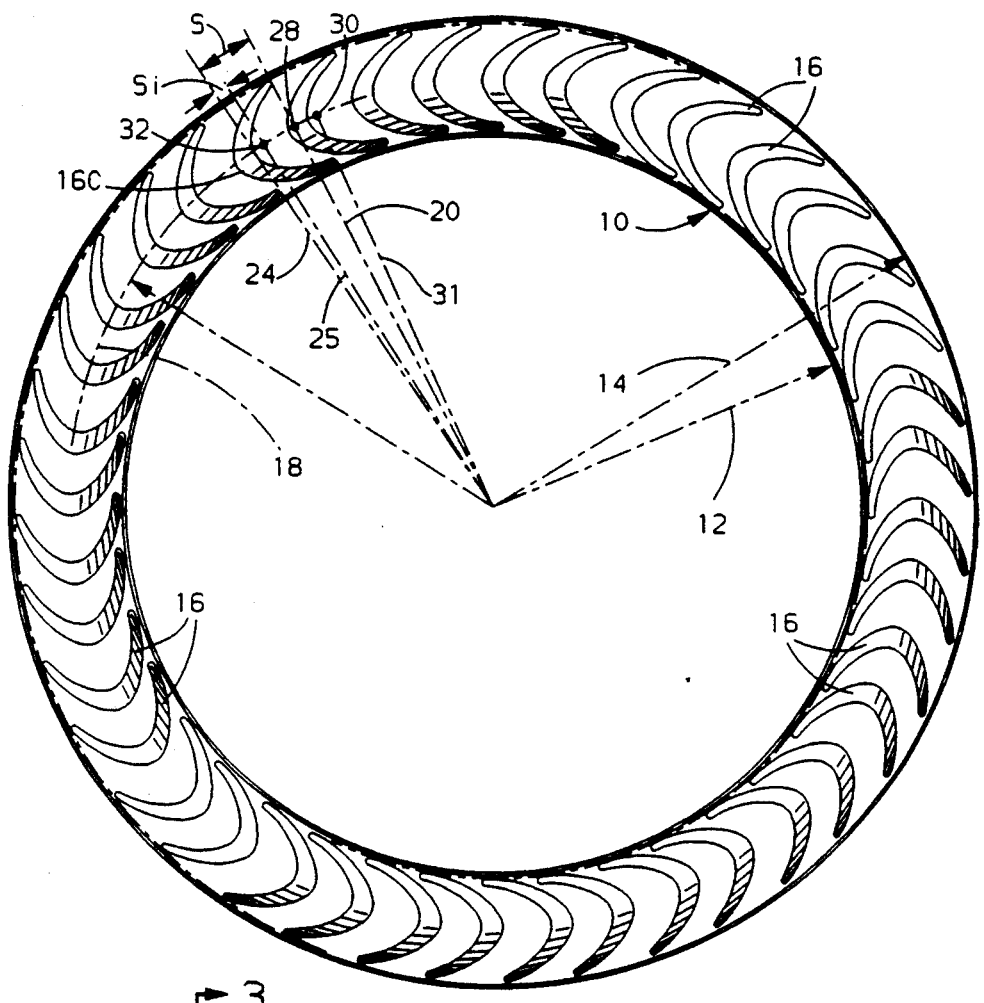
FIG. 1 is an elevational view of a portion of a hydrodynamic retarder showing the disposition of the blade members within one semi-toroidal shell.

Referring to the drawings, wherein like characters represent the same or corresponding parts throughout the several views, there is seen in FIG. 1, a semi-toroidal member 10 having an inner radius 12, an outer radius 14 and a plurality of blades 16 disposed between the radii 12 and 14. The blades 16 are identical in structure, such that reference to a specific blade will be considered as a description of all blades. In reference to specific blades, the designation will include an alpha suffix, such as 16A, 16B, etc. The semi-toroidal member 10 has a mean radius 18 about which the blades 16 are formed.

Figure 3:
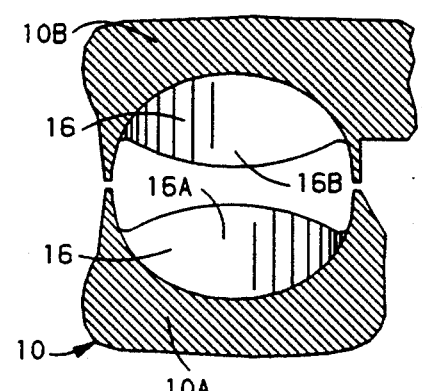
FIG. 3 is a view taken along line 3—3 of FIG. 2.

As best seen in FIG. 3, a hydrodynamic retarder is comprised of a semi-toroidal member 10A which is grounded to provide a stationary member, and a semi-toroidal member 10B which is rotatably supported on a shaft, not shown. Each semi-toroidal member 10A and 10B has formed therein a plurality of blades 16 which are disposed in facing relationship. The curvature of the blades 16B disposed in semi-toroidal member 10B are curved in a direction opposite to the curvature of the blades 16A formed in the semi-toroidal member 10A.

Figure 2:
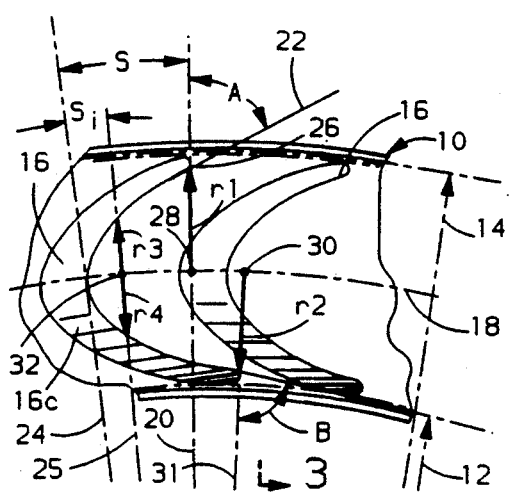
FIG. 2 is an enlarged view of a portion of the blade profiles shown in FIG. 1.

As best seen in FIG. 2, each blade, such as blade 16C, has an entrance angle A which is measured at the intersection point between a radial line 20 and a line 22, which is tangential to the curvature of the blade 16C. The curvature of the blade 16C is determined by the following equation:

$$S = Kr^2$$

The term "S" represents the circumferential distance along the blade profile measured from the point of intersection between a radial line 24 and the mean radius 18. The term "K" is a constant within the equation and the term "r" is a radial measurement taken between the mean radius 18 and the blade profile along radial lines, such as radius 20, emanating from the center of the semi-toroidal member 10.

The equation essentially defines an arc-parabola. It should be noted that the circumferential distance or arc-length "S" differs radially, such that a nonsymmetrical blade form will be generated about the mean radius 18. This is perhaps best seen in FIG. 2, wherein the entrance 26 of the blade 16C is defined as having a radius r1 which is taken from a point 28 at the intersection of radial line 20 and the mean radius 18, and the blade exit is defined by a radius r2 taken from a point 30 at the intersection of radial line 31 and the mean radius 18.

An intermediate measurement Si along the blade profile is taken from point 32 at the intersection of radial line 25 and the mean radius 18 from which outer radii r3 and inner radii r4 will define respective points along the profile of the blade 16C.

It has been determined that a blade shape generated in this manner will provide a constant acceleration of flow along the blade surface. With a constant acceleration flow, the benefits of reduced pressure gradients resulting from the dynamic pressure which is present along the blade profile will result in reduced flow separation between the blade surface and the fluid. The blade surface formed in this manner, also has the advantage of being capable of manufacture with a computer controlled blade cutting machine.

As discussed above, the blade form is a constant acceleration flow profile such that the second derivative of the profile equation will provide a constant which is essentially equal to 2K; and the first derivative is equal to 2KR which is the slope at the entrance or exit angle. Accordingly, the designer can determine the entrance angle desired, and from such knowledge, calculate the constant K to be utilized in the equation defining the blade angle form. The entrance angle is preferably in the range of 51° to 90 degrees. It has been found that extremely efficient hydrodynamic retarders can be manufactured with the entrance angle in the range of 65-90 degrees. Since it is desirable that the entrance and exit angles are equal, the ranges are also preferred for the exit angle B.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydrodynamic retarder comprising a pair of facing substantially semi-toroidal bodies, each of the bodies having an inner radius and an outer radius defining the limits of the toroid and a mean radius, one of the bodies being mounted for rotation and the other being stationary; a plurality of blade elements disposed on each of said bodies with each blade element having an entrance angle substantially adjacent one of the inner and outer radii, an exit angle substantially adjacent the other of the radii, and a fluid flow profile surface means connecting the entrance and exit and defined by a plurality of radial dimensions measured from the mean radius for providing a constant acceleration fluid flow path defined by a relationship comprised of a distance (S) along a circumference of the toroid being equal to a constant (K) multiplied by the square of the radial dimension (R) of the toroid between the inner and outer radii measured from the mean radius, wherein the constant (K) is determined by evaluation of the first derivative of the relationship $S=KR^2$, a tangent of one of the entrance angle and exit angle and a value equal to twice the radius at the one angle such that $K=(Tan(\theta))/2R$.

2. The hydrodynamic retarder defined in claim 1 wherein the entrance angle is in the range of 51° to 90 degrees.

3. The hydrodynamic retarder defined in claim 2 wherein the exit angle is in the range of 51° to 90 degrees.

4. The hydrodynamic retarder defined in claim 1 wherein the entrance and exit angles are equal.

5. The hydrodynamic retarder defined in claim 4 wherein the entrance and exit angles are in the range of 65°–90 degrees.

6. The hydrodynamic retarder defined in claim 1 wherein the entrance angle is in the range of 70° to 91 degrees, and the exit angle is in the range of 70° to 91 degrees.

* * * * *